United States Patent Office 3,114,746
Patented Dec. 17, 1963

3,114,746
REACTIVE DYESTUFFS
Jakob Benz, Munchenstein, and Lukas Schneider, Basel, Switzerland, assignors to Sandoz Ltd., also known as Sandoz A.G., Basel, Switzerland
No Drawing. Filed Mar. 21, 1960, Ser. No. 16,187
Claims priority, application Switzerland Apr. 10, 1959
9 Claims. (Cl. 260—163)

This invention relates to water-soluble reactive dyestuffs which contain at least one γ-halogeno-crotonyl group. The process for the production of these dyestuffs consists in reacting organic dyestuffs containing at least one exchangeable hydrogen atom, or organic compounds containing at least one exchangeable hydrogen atom plus a substituent capable of dyestuff formation, with a γ-halogenocrotonic acid halide, upon which the resulting reaction products, when they contain radicals of organic compounds with substituents capable of dyestuff formation, are converted into water-soluble dyestuffs by a suitable reaction.

The new process is applicable with all classes of water-soluble dyestuffs. Exchangeable hydrogen atoms which are preferred for this purpose are those of the amino group which may be monosubstituted by alkyl, hydroxyalkyl, alkoxyalkyl or halogenoalkyl radicals. Thus the water-soluble organic dyestuffs of primary interest in this connection are those which contain at least one amino group, which group can be linked directly to an aromatic nucleus of the dyestuff molecule or indirectly through an aliphatic chain and, if desired, a bridge member to the dyestuff molecule.

The following are examples of aliphatic chains:

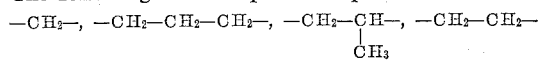

and

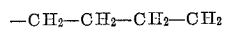

Examples of suitable bridge members are:

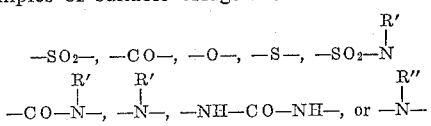

wherein R′ denotes hydrogen, low molecular alkyl or hydroxyalkyl, cycloalkyl, aryl or aralkyl, and R″ denotes an acyl radical.

Notable examples of this type of dyestuffs are aminomonoazo, aminopolyazo, aminoanthraquinone and aminophthalocyanine dyestuffs. The aminomonoazo and aminopolyazo dyestuffs may contain metal atoms, e.g. chromium, cobalt, nickel or copper atoms, combined by coordinative linkages. Aminomonoazo dyestuffs which contain metallizable groupings also can be reacted with a γ-halogenocrotonic acid halide. The dyestuffs of the latter type can be metallized, for example, in substance after condensation, or they can be reacted in the metal-free form with the fiber by one of the normal methods and the dyeings aftertreated with metal-yielding agents.

γ-Chlorocrotonic acid bromide and γ-bromocrotonic acid bromide, preferably γ-bromocrotonic acid chloride and γ-chlorocrotonic acid chloride, are illustrative of the γ-halogenocrotonic acid halides which can be employed.

In accordance with the above definition, water-soluble dyestuffs possessing at least once the group halogen-$CH_2$—$CH$=$CH$—$CO$— can be obtained by another route starting from organic compounds which contain at least one exchangeable hydrogen atom plus a substituent capable of dyestuff formation. The azo coupling has an important bearing on the subsequent reaction giving the final dyestuffs. It can be accomplished by reacting a compound containing at least one exchangeable hydrogen atom plus a diazotizable amino group with a γ-halogenocrotonic acid halide, diazotizing the intermediate product, and coupling the diazo compound with a coupling component to give a water-soluble dyestuff; or alternatively by reacting a compound containing at least one exchangeable hydrogen atom and one substituent convertible into a diazotizable amino group with a γ-halogenocrotonic acid halide, converting this substituent in the intermediate into the amino group, diazotizing the amino compound and coupling the diazo compound with a coupling component to give a water-soluble dyestuff. It is also possible to react a γ-halogenocrotonic acid halide with a diamino compound containing an amino group of high reactivity and another of low reactivity and to use the resulting condensation product, which contains a free amino group and the radical halogen-$CH_2$—$CH$=$CH$—$CO$—, as a diazo component.

Further, compounds having at least one exchangeable hydrogen atom plus a carbon atom capable of coupling, e.g. aminohydroxy compounds, can be condensed with a γ-halogenocrotonic acid halide to yield an intermediate product which can be used as coupling compound. It naturally follows that the diazo compound produced with a diazo component containing the radical halogen-$CH_2$—$CH$=$CH$—$CO$— can be coupled with a coupling component which likewise contains a radical halogen-$CH_2$—$CH$=$CH$—$CO$—.

In choosing the starting dyestuffs it is necessary to ensure that they contain a sufficient number of water-solubilizing groups, e.g. sulfonic acid and/or carboxylic acid groups, to confer upon the final dyestuffs good solubility in water. Some suitable systems which show excellent behavior as reactive dyestuffs in the present invention are described in French Patent 1,247,516.

The reaction of the water-soluble dyestuffs or of the compounds containing an amino group which are used as starting products is carried out with a γ-halogenocrotonic acid halide in aqueous medium with good cooling and in presence of an acid-binding agent such as sodium carbonate, sodium hydroxide, barium hydroxide, calcium hydroxide or sodium acetate.

The acylation can of course be carried out in an organic solvent in place of an aqueous medium.

In the case of acylation in aqueous medium it is advisable to dissolve the employed amount of carboxylic acid chloride in twice to five times its amount of benzene, chlorobenzene, methylbenzene, dimethylbenzene or acetone, and to add this solution dropwise to the aqueous solution of the amino component at a temperature of about 0–30° C., but preferably at 0–5° C., and in presence of an acid-binding agent, the preferred pH-range being 3 to 9.

On completion of condensation or coupling the solution or suspension containing the dyestuff may be neutralized if desired, and the final reactive dyestuff is then salted out by the addition of sodium or potassium chloride, or precipitated with acid; it is subsequently filtered with suction, washed and dried.

The reactive dyestuffs obtained according to the invention which contain at least one γ-halogenocrotonyl radical are suitable for dyeing, padding and printing fibers of vegetable and animal origin, fibers of regenerated cellulose, casein fibers, animalized cellulosic fibers, synthetic polyamide fibers and mixtures of these fibers as well as leather. Where necessary the dyeings are aftertreated in an alkaline medium at high temperature and subsequently soaped. The dyed or printed goods possess good color fastness to light washing, milling and perspiration.

In the following examples the parts and percentages are by weight and the temperatures are in degrees centigrade.

EXAMPLE 1

23.5 parts of the neutral disodium salt of the dyestuff 2 - amino - 5 - hydroxy - 6 - phenylazonaphthalene - 2'.7-disulfonic acid are dissolved in 600 parts of water. To this solution at 0–5° C there is added dropwise with vigorous stirring over a period of 1 to 2 hours 10.5 parts of γ-gromocrotonic acid chloride, with simultaneous addition of a 10% sodium carbonate solution so that the reaction mixture has a constant pH value of 6.0 to 7.5. On completion of the reaction the dyestuff formed is precipitated with common salt, filtered off and dried. It is a red-brown powder which dissolves in water to give orange solutions. The identical dyestuff can also be obtained by the following procedure:

47.8 parts of 2-amino-5-hydroxynaphthalene-7-sulfonic acid are dissolved in 800 parts of water at pH 7 by the addition of a 30% aqueous solution of sodium hydroxide. The solution is externally cooled with ice and water to about 3° and over the next 90 minutes or so a solution of 50 parts of γ-bromocrotonic acid chloride in 100 parts of anhydrous acetone is added dropwise. At the same time the pH value is maintained at about 6–7 by dropping in a 20% aqueous solution of sodium carbonate. The reaction product is well soluble in water and can be isolated by salting out. Alternatively the reaction solution can be used for coupling after it has been brought to pH 4 with a little hydrochloric acid.

To produce the dyestuff, diazotation is carried out directly in the normal way with 34.6 parts of 1-aminobenzene-2-sulfonic acid. The diazo suspension is run into the solution of the coupling component and subsequently the pH value is adjusted to about 5 by running in a 50% aqueous solution of sodium acetate. On the following day the dyestuff is completely precipitated by the addition of sodium chloride and filtered off, dried at about 60° and ground to give an orange-colored powder.

When in place of γ-bromocrotonic acid chloride the equivalent amount of γ-chlorocrotonic acid chloride is employed, a similar dyestuff with the same fastness properties is obtained.

Cotton sateen is padded with a 3% neutral, cold or warm solution of the dyestuff obtained according to the above details at an expression (pick-up) of about 75%. The impregnated material is rolled up and dried. The dyeing is fixed by working about the material for about 30 minutes in a developing bath at 80–90° prepared with 300 parts of sodium sulfate or 300 parts of sodium chloride, 5 parts of sodium carbonate and 1 part of sodium 3-nitrobenzene sulfonate per 1000 parts of the solution. The liquor ratio of this bath may vary from 1:15 to 1:50.

In place of sodium carbonate the developing bath can contain 2 cc. per liter of a 30% aqueous solution of sodium hydroxide. After this treatment the material is well rinsed in cold water, soaped at the boil for 20 minutes, rinsed again and dried. The orange dyeing thus obtained possesses very good fastness to light and wet agencies.

EXAMPLE 2

94 parts of 1.3-diaminobenzene-6-sulfonic acid are dissolved neutral in 1500 parts of water with the addition of a 30% aqueous solution of sodium hydroxide. The solution is cooled to 0–3° with ice, 200 parts of crystallized sodium acetate are added, and in about 30 minutes a solution of 100 parts of γ-chlorocrotonic acid chloride in 200 parts of anhydrous acetone is added dropwise with vigorous stirring. At the same time the pH value is maintained at about 6 by dropping in a 20% aqueous solution of sodium carbonate. On completion of the reaction, concentrated hydrochloric acid is added to give an acid reaction on Congo red paper, and the crystallized reaction product is filtered off after a further hour or so.

An amount of the filtercake of the 1-amino-3-(γ-chloro)crotonylaminobenzene-6-sulfonic acid containing 29.1 parts of the dry product is suspended in 500 parts of water and cooled with ice to 0–5°. 30 parts of 30% hydrochloric acid are added and diazotization is carried out directly by the slow addition of a 4 n sodium nitrite solution.

The diazo suspension is run slowly into a neutral solution of 32.3 parts of 1-(2'.5'-dichloro)-phenyl-3-methyl-5-pyrazolone-4'-sulfonic acid in 300 parts of water. The pH value is adjusted to about 7 by adding dropwise a 20% aqueous solution of sodium carbonate. The whole is stirred overnight and the dyestuff is then completely precipitated with sodium chloride, filtered off and dried with vacuum at about 70°. The ground dyestuff is a yellow powder which dissolves in water with a yellow coloration and dyes viscose filament and staple fiber materials in greenish-yellow shades showing excellent light and wet fastness properties.

In an exactly analogous manner 1.4-diaminobenzene-6-sulfonic acid in place of 1.3-diaminobenzene-6-sulfonic acid can be acylated with γ-chlorocrotonic acid chloride. On diazotization and coupling to 1-(2'.5'-dichloro)-phenyl-3-methyl-5-pyrazolone-4'-sulfonic acid a dyestuff is formed which gives reddish-yellow prints with good fastness to light, washing, perspiration, water, tartaric acid, pressing, rubbing and dry cleaning.

EXAMPLE 3

42.1 parts of the dyestuff 2-(4'-amino-2'-methyl)-phenyl-azo-naphthalene-4.8-disulfonic acid are dissolved neutral in 1200 parts of water by the addition of 30% sodium hydroxide solution. To this solution are added 54.5 parts of crystallised sodium acetate and it is then cooled with ice to 0–5°. In about 1 hour a solution of 33 parts of γ-chlorocrotonic acid chloride and 50 parts of chlorobenzene is added dropwise with vigorous stirring. On completion of condensation the reaction mixture is made weakly alkaline with sodium carbonate and the dyestuff is salted out with the addition of sodium chloride. It is filtered off, dried and ground. The yellow powder obtained dissolves in water to give a yellow solution.

Cotton sateen is pad-dyed with this dyestuff according to the precedure described in Example 1. The greenish-yellow dyeing obtained possesses good fastness to washing, water, perspiration, rubbing, gas fumes and dry cleaning. When the 33 parts of γ-chlorocrotonic acid chloride are replaced by an equivalent amount of γ-bromocrotonic acid chloride, a similar dyestuff is obtained.

EXAMPLE 4

Of the aminoazo dyestuff produced by acid coupling of diazotized 1-amino-4-nitrobenzene with 1-amino-8-hydroxynaphthalene-3.6-disulfonic acid and reduction of the nitro group with sodium sulfide, 43.8 parts are dissolved in 400 parts of water by the addition of a 30% aqueous solution of sodium hydroxide in an amount necessary to dissolve the aminoazo dyestuff. The solution is externally cooled to 0° with ice. In the course of about 1 hour a solution of 25 parts of γ-chlorocrotonic acid chloride in 100 parts of acetone is added dropwise and at the same time the pH value is maintained at 7 with sodium carbonate. The acylated dyestuff is precipitated and is filtered off directly. The dyestuff paste obtained is dissolved neutral in 500 parts of water and the solution cooled to 5°. To it is added the suspension of the diazo compound of 29.1 parts of 1-amino-3-(γ-chloro)-crotonylaminobenzene-6-sulfonic acid and subsequently crystallized sodium acetate so that the pH value increases to about 6. On the following day the mixture is heated at 60° and the disazo dyestuff isolated by filtration. On drying it is obtained as a black powder.

Cellulosic fibers are dyed with this dyestuff in green-gray to black shades, depending on the dyestuff concentration. The yield of fixed dyestuff is practically 100%. The dyeings are fast to soda boiling, washing, perspiration and light.

A similar dyestuff is obtained when 1-amino-4-nitrobenzene-2-sulfonic acid is used for acid coupling in place of 1-amino-4-nitrobenzene.

Equally valuable are the disazo dyestuffs which are produced in a strictly analogous manner by coupling 2 moles of diazotized 1-amino-3-(γ-chloro)-crotonylaminobenzene-6-sulfonic acid or 1-amino-3-(γ-bromo)-crotonylaminobenzene-6-sulfonic acid with 1 mole of 1-amino-8-hydroxynaphthalene-3.6- or -4.6-disulfonic acid.

EXAMPLE 5

An amount of the presscake of the 1-amino-3-(γ-chloro)-crotonylaminobenzene-6-sulfonic acid obtained according to Example 2 and containing 29.1 parts of the dry product is suspended in 500 parts of water and the solution cooled with ice to 0–5°. 30 parts of 30% hydrochloric acid are added and diazotization is carried out directly by slow addition of a 4 n sodium nitrite solution. The diazo compound is filtered off and run slowly into a neutral solution of 30.4 parts of 1-hydroxynaphthalene-4.7-disulfonic acid. The pH value of the coupling mass is made alkaline with sodium bi-carbonate.

The dyestuff formed is precipitated by the addition of sodium chloride and filtered off, dried and ground to give a red powder.

1.5 parts of the dyestuff obtained according to the above details are dissolved in 3000 parts of soft water at 40°. 100 parts of a fabric of mercerized cotton sateen are entered in this dyebath and after the addition of 75 parts of calcined sodium sulfate the temperature is increased to 90° in 15 minutes. Another 75 parts of calcined sodium sulfate and 60 parts of calcined sodium carbonate are added. After dyeing for 1 hour at 90° the goods are rinsed cold and warm, soaped at the boil for 10–20 minutes with a solution of 2 grams per liter of an alkylpolyglycol ether sulfate, rinsed again and dried. A scarlet dyeing fast to light and wet treatments is obtained.

EXAMPLE 6

32 parts of 1-amino-8-hydroxynaphthalene-3.6-disulfonic acid are dissolved in 100 parts of water by the addition of sodium hydroxide solution at pH 6.5. 100 parts of crushed ice and 50 parts of crystallized sodium acetate are added and in the course of about 30 minutes at 0–5° a solution of 20 parts of γ-chlorocrotonic acid chloride and 80 parts of anhydrous acetone. During this time the pH value is maintained at about 6 by dropwise addition of a 20% aqueous sodium carbonate solution. The condensation product is partially crystallized out and can be completely precipitated with common salt. The product is filtered off and washed with sodium chloride solution.

To produce the dyestuff, diazotization is carried out directly in the normal way with 17.3 parts of 1-aminobenzene-2-sulfonic acid, and the diazo suspension obtained is run into the cold solution of the filtercake in 400 parts of water. By the addition of crystallized sodium acetate the pH value is adjusted to 5–6. The dyestuff is isolated by salting out and filtration, then dried and ground. It is a red powder which dissolves in water with a red coloration. A mercerized cotton fabric is printed with a paste of the following composition:

20 parts of the dyestuff obtained according to the above details,
100 parts of urea,
360 parts of water,
500 parts of gum tragacanth thickening 6%, and
20 parts of sodium carbonate 1000 parts The fabric is dried, steam for 10 minutes, then rinsed in cold and boiling water, and dried. A bright red print with excellent wet fastness properties is obtained.

When the 20 parts of γ-chlorocrotonic acid chloride are replaced by 27 parts of γ-bromocrotonic acid chloride, a dyestuff with similar fastness properties is obtained. By employing 1-amino-4-methylbenzene-2-sulfonic acid in place of 1-aminobenzene-2-sulfonic acid, a dyestuff is obtained which gives bright, somewhat more bluish red prints. In a completely analogous manner 1-amino-8-hydroxynaphthalene - 4.6 - disulfonic acid in place of 1-amino - 8 - hydroxynaphthalene-3.6-disulfonic acid can be acylated with γ-chloro- or γ-bromocrotonic acid chloride. The dyestuffs produced from the products with diazotized 1-aminobenzene-2-sulfonic acid give scarlet prints with excellent light and wet fastness properties.

EXAMPLE 7

10.7 parts of the dyestuff sodium 1-amino-4-(4'-amino)-phenylamino-anthraquinone-2.3'-disulfonate are dissolved in 300 parts of water. The pH value of the solution is adjusted to 7 and with very vigorous stirring 6 parts of γ-chlorocrotonic acid chloride diluted with 15 parts of anhydrous acetone are dropped in at 0–5° in about 1 hour. By careful dropwise addition of 10% aqueous sodium hydroxide solution the pH value of the solution is maintained at 6.5–7. On completion of acylation the dyestuff is precipitated by the addition of 60 parts of sodium chloride. It is filtered off, washed with 15% sodium chloride solution and dried with vacuum at about 45°. The dark powder obtained dissolves in water with a blue coloration. On padding wool with an aqueous solution of this dyestuff and heat-treating the goods in presence of an agent of weakly alkaline reaction, blue dyeings of good light and wet fastness are obtained.

When the sodium 1-amino-4-(4'-amino)-phenylamino-anthraquinone-2.3'-disulfonate is replaced by an equal amount of sodium 1-amino-4-(4'-amino)-phenylamino-anthraquinone-2.7-disulfonate, a similar dyestuff is obtained. In place of the 6 parts of γ-chlorocrotonic acid chloride it is possible to use 8 parts of γ-bromocrotonic acid chloride.

EXAMPLE 8

57.6 parts of copper phthalocyanine are added to 270 parts of chlorosulfonic acid and the solution heated for 3 hours at 140–145°. On cooling to room temperature it is poured on to a mixture of ice and water, and the precipitate is filtered off at 0° and washed with ice-cold, diluted hydrochloric acid. The presscake is stirred into 300 parts of ice and 300 parts of water, dilute sodium hydroxide being added to bring the pH to 5. 15 parts of 1-amino-4-acetyl-aminobenzene are strewn in and the solution slowly heated to 45–50° with simultaneous addition to dilute sodium hydroxide solution to keep the pH value at 5.0–5.5. After 3 hours the solution is rendered weakly alkaline by an addition of sodium hydroxide and heated at 80° for 1 hour. At this temperature 200 parts of 30% hydrochloric acid are added and the mixture maintained at 70–80° until the acetyl group is completely split off. The free, precipitated amino compound is then filtered off and washed with dilute hydrochloric acid.

The filter cake is dissolved in 1000 parts of water by the addition of 30% aqueous sodium hydroxide solution. The solution is cooled to 0° with ice and with vigorous stirring 35 parts of γ-chlorocrotonic acid chloride diluted with 100 parts of anhydrous acetone are added dropwise in about 40 minutes. By careful dropwise addition of a 30% aqueous sodium hydroxide solution the dyestuff is maintained in the dissolved state during acylation. The temperature is maintained at 0° by the addition of ice. When acrylation is completed the dyestuff is precipitated by the addition of sodium chloride, filtered off, dried and ground. It is in the form of a dark blue powder which dissolves in water to give turquoise-blue solutions.

Cotton sateen is printed with a paste of the following composition:

30 parts of the dyestuff obtained according to the details given above,
100 parts of urea,
490 parts of water,
350 parts of a 4% sodium alginate thickening,
30 parts of sodium carbonate 1000 parts After drying, the fabric is steamed for 10–15 minutes at 102–104°, rinsed well in cold and warm water, soaped at the boil and dried. A brilliant turquoise-blue print of good light and wet fastness is obtained.

The following table contains the chemical names of dyestuffs free from reactive groups and corresponding to the reactive dyestuffs of the invention which contain a γ-chloro- or a γ-bromocrotonyl radical and are obtained according to the details given in Examples 1 to 8. In these names the amino group or groups to which the γ-chloro- or γ-bromocrotonyl radical is attached, are underlined.

(9) 1-(2'-chloro)-phenyl-3-methyl-4-(3''-amino)-phenylazo-5-pyrazolone-5'.6''-disulfonic acid.
(10) 1-(2'-chloro-6'-methyl)-phenyl-3-methyl-4-(3''-amino)-phenylazo-5-pyrazolone-6''-sulfonic acid.
(11) 1-hydroxy-2-(3'-amino)-phenylazo-naphthalene-4.8.6'-trisulfonic acid.
(12) 2-amino-7-phenylazo-8-hydroxy-naphthalene-6.2'-disulfonic acid.
(13) 1-amino-4-(4'-amino)-phenylamino-anthraquinone-2.6.3'-trisulfonic acid.
(14) 4-amino-4'-(4''-methoxy)-phenylazo-1.1'stilbene-2.2'-disulfonic acid.
(15) 1-amino-7-(4'-methyl)-phenylazo-8-hydroxy-naphthalene-4.6-disulfonic acid.
(16) 1-hydroxy-2-(3'-amino)-phenylazo-naphthalene-3.6.6'-trisulfonic acid.
(17) 1-amino-4-[4'-(4''-amino)-phenyl]-phenyl-aminoanthraquinone-2.6.3''-trisulfonic acid.
(18) Copperphthalocyanine-trisulfonic acid amide-sulfonic acid-(4'-amino)-phenylamide.
(19) 1-amino-7-(2'-methyl)-phenylazo-8-hydroxy-naphthalene-3.6.5'-trisulfonic acid.
(20) 1-amino-7-(2'-methyl)-phenylazo-8-hydroxy-naphthalene-3.6.4'-trisulfonic acid.
(21) 1-amino-7-(4'-methoxy)-phenylazo-8-hydroxy-naphthalene-3.6.6'-trisulfonic acid.
(22) 1-amino-7-(3'-acetylamino)-phenylazo-8-hydroxy-naphthalene-3.6.6'-trisulfonic acid.
(23) 1-amino-7-(3'-amino)-phenylazo-8-hydroxy-naphthalene-3.6.6'-trisulfonic acid.
(24) 1-amino-7-(3'-amino-4'-methyl)-phenylazo-8-hydroxy-naphthalene-3.6.6'-trisulfonic acid.
(25) 1-amino-7-(3'-trifluoromethyl)phenylazo-8-hydroxynaphthalene-3.6.6'-trisulfonic acid.
(26) 1-amino-7-[4'-(6''-methyl)-benzothiazolyl - (2'')]-phenylazo-8-hydroxy-naphthalene - 3.6.x'' - trisulfonic acid.
(27) 2-(4'-amino)-phenylazo-naphthalene-4.8-disulfonic acid.
(28) 2-(4'-amino-2'-acetylamino)-phenylazo-naphthalene-4.8-disulfonic acid.
(29) 2-(4'-amino-2'-sulfoacetylamino)-phenylazo-naphthalene-4.8-disulfonic acid.
(30) 2-(4'-amino-3'-carboxy)-phenylazo-naphthalene-4.8-disulfonic acid.
(31) 2-(4'-amino-2'-methyl)-phenylazo-naphthalene-5.7-disulfonic acid.
(32) 1-phenyl-3-methyl-4-(3''-amino)-phenylazo-5-pyrazolone-2'.6''-disulfonic acid.
(33) 1-[(4''-acetylamino)-stilbenyl-(4')]-3 - methyl - 4 - (3'''-amino)-phenylazo-5-pyrazolone-2'.2''.6''' - trisulfonic acid.
(34) 1 - (2'.5' - dichloro)-phenyl-3-methyl-4-[(4'''-amino)-phenyl]-phenylazo-5-pyrazolone-4'.2''-disulfonic acid.
(35) 1-[3'-keto-2'-(3''-amino)-phenylazo]-butyramino-benzene-4.6''-disulfonic acid.
(36) 1-naphthyl-(2')-3-methyl-4-(4''-amino)-phenylazo-5-pyrazolone-5'.7'.2''-trisulfonic acid.
(37) 1-(2'.5'-dichloro)-phenyl-3-methyl-4-(4''-amino)-phenylazo-5-pyrazolone-4'.2''-disulfonic acid.
(38) 1-barbiturylazo-3-amino-benzene-6-sulfonic acid.
(39) 1 - (2'.5' - dichloro) - phenyl - 3 - methyl - 4 - [4''-(4''' - amino - 2''' - methyl) - phenyl - 3'' - methyl]-phenylazo-5-pyrazolone-4'.6''-disulfonic acid.
(40) 1-naphthyl-(2')-3-methyl-4-(3'-amino)-phenylazo-5-pyrazolone-4'.8'.6''-trisulfonic acid.
(41) 1-phenyl-3-methyl-4-(4''-amino)-phenylazo-5-pyrazolone-2'.5'.2''-trisulfonic acid.
(42) 1-(3'-amino)-phenylazo-2-hydroxy-naphthalene-6.6'-disulfonic acid.
(43) 1-(3'-amino)-phenylazo-2-hydroxy-naphthalene-8.6'-disulfonic acid.
(44) 1-(3'-amino)-phenylazo-2-hydroxy-naphthalene-6.8.6'-trisulfonic acid.
(45) 1-(3'-amino)-phenylazo-2-hydroxy-naphthalene-3.6.6'-trisulfonic acid.
(46) 1-(3'-amino)-phenylazo-2-hydroxy-naphthalene-3.6.8.6'-tetrasulfonic acid.
(47) 1-hydroxy-2-(3'-amino)-phenylazo-naphthalene-3.6'-disulfonic acid.
(48) 1-hydroxy-2-(3'-amino)-phenylazo-naphthalene-4.6'-disulfonic acid.
(49) 1-hydroxy-2-(3'-amino)-phenylazo-naphthalene-5.7.6'-trisulfonic acid.
(50) 1-hydroxy-2-(3'-amino)-phenylazo-naphthalene-3.8.6'-trisulfonic acid.
(51) 1-hydroxy-2-(3'-amino)-phenylazo-8-chloro-naphthalene-3.6.6'-trisulfonic acid.
(52) 1-hydroxy-2-(3'-amino)-phenylazo-8-acetyl-amino-naphthalene-3.6.6'-trisulfonic acid.
(53) 1-hydroxy-2-(3'-amino)-phenylazo-8-(4''-chloro)-benzoylamino-naphthalene-3.6.6-trisulfonic acid.
(54) 1-hydroxy-2-(3'-amino)-phenylazo-6-propionyl-amino-naphthalene-3.6'-disulfonic acid.
(55) 1-hydroxy-2-(3'-amino)-phenylazo-7-propionyl-amino-naphthalene-3.6'-disulfonic acid.
(56) 1-hydroxy-2-(3'-amino)-phenylazo-7-amino-naphthalene-3.6'-disulfonic acid.
(57) 1-hydroxy-2-(3'-amino-4'-methyl)-phenylazo-naphthalene-4.6'-disulfonic acid.
(58) 1-hydroxy-2-(3'-amino-4'-methyl)-phenylazo-naphthalene-3.6.6'-trisulfonic acid.
(59) 1-(4'-amino)-phenylazo-2-hydroxy-naphthalene-8.2'-disulfonic acid.
(60) 1-(4'-amino)-phenylazo-2-hydroxy-naphthalene-6.8.2'.-trisulfonic acid.
(61) 1-hydroxy-2-(4'-amino)-phenylazo-naphthalene-3.2'-disulfonic acid.
(62) 1-hydroxy-2-(4'-amino)-phenylazo-8-acetylamino-naphthalene-3.5.2'-trisulfonic acid.
(63) 1-hydroxy-2-(4'-amino)-phenylazo-8-(3''-chloro)-benzoylamino-naphthalene-3.5.2'-trisulfonic acid.
(64) 1-[4'-(4''-amino)-phenyl]-phenylazo-2-hydroxy-naphthalene-6.8.2''-trisulfonic acid.
(65) 1-hydroxy-2-[4'-(4''-amino)-phenyl]-phenylazo-naphthalene-3.6.2''-trisulfonic acid.
(66) 1-hydroxy-2-[4'-(4''-amino)-phenyl]-phenylazo-8-chloronaphthalene-3.6.2''-trisulfonic acid.
(67) 1-hydroxy-2-[4'-(4''-amino-2''-methyl)-phenyl-3'-methyl]-phenylazo-naphthalene-4.6'-disulfonic acid.
(68) 1-hydroxy-2-[4'-(4''-amino-2''-methyl)-phenyl-3'-methyl]-phenylazo-naphthalene-3.6.6'-trisulfonic acid.
(69) 1-hydroxy-2-[4'-(4''-amino-2''-methyl)-phenyl-3'-methyl]-phenylazo-naphthalene-3.8.6'-trisulfonic acid.

(70) 1-[4'-(4''-amino-2''-methyl)-phenyl-3'-methyl]-phenylazo-2-amino-8-hydroxy-naphthalene-6.6'-disulfonic acid.

(71) 1-[4'-(4''-amino-2''-methyl)-phenyl-3'-methyl]-phenylazo-2-amino-8-hydroxy-naphthalene-3.6.6'-trisulfonic acid.

(72) 1-(4'-amino)-naphthyl-(1')-azo-4-naphthyl-(1'')-azo-naphthalene-6(7).6'(7').5''-trisulfonic acid.

(73) 4-(4'''-amino)-phenylazo-4-(4''''-phenylazo)-phenylazo-stilbene-2.2'.4''''-trisulfonic acid.

(74) 4-amino-4'-(1'', 2''-napthylene)-triazole-stilbene-2.2'.4''-trisulfonic acid.

(75) 1-amino-2-(4'-amino)-phenylazo-7-phenylazo-8-hydroxy-naphthalene-3.6.4''-trisulfonic acid.

(76) 4-amino-4'-(4''-methoxy)-naphthyl-(1'')-azostilbene-2.2'-disulfonic acid.

(77) 1-(4'-amino)-benzoylamino-7-phenylazo-8-hydroxy-naphthalene-3.6.2'-trisulfonic acid.

(78) Copper complex compound of 1-hydroxy-2-(2'-hydroxy-5'-methyl)-phenylazo-6-amino-naphthalene-3.4'-disulfonic acid.

(79) Copper complex compound of 1-hydroxy-2-(2'-hydroxy)-naphthyl-(1')-azo-6-amino-naphthalene-3.4'-disulfonic acid.

(80) Copper complex compound of 1-hydroxy-2-(1'-hydroxy)-naphthyl-(2')-azo-8-amino-naphthalene-3.6.4'6'-tetrasulfonic acid.

(81) Copper complex compound of 1-(2'-hydroxy-3'-amino)-phenylazo-2-hydroxy-naphthalene-6.5'-disulfonic acid.

(82) Nickel complex compound of 1-hydroxy-2-(2'-hydroxy)-phenylazo-6-amino-naphthalene-3.3'.5'-trisulfonic acid.

(83) 1:2-chromium complex compound of 1-hydroxy-2-(2'-hydroxy-3'-chloro)-phenylazo-6-amino-naphthalene-3.5'-disulfonic acid.

(84) 1:2-chromium complex compound of 1-(2'-hydroxy)-phenylazo-2-hydroxy-8-amino-naphthalene-5'-sulfonic acid.

(85) 1:2-cobalt complex compound of 1-phenyl-3-methyl-4-(2''-hydroxy-3''-amino)-phenylazo-5-pyrazolone-4'.5''-disulfonic acid.

(86) Mixed 1:2-chromium complex compound of 1-(2'-hydroxy-3'-chloro)-phenylazo-2-hydroxy-8-acetylamino-naphthalene-5'-sulfonic acid and 1-hydroxy-2-(2-hydroxy-3'-chloro)-phenylazo-6-amino-naphthalene-3.5'-disulfonic acid.

(87) 1-amino-4-(3'-amino)-phenylamino-anthraquinone-2.7.4'-trisulfonic acid.

(88) 1-amino-4-(3'-amino-6'-methyl)-phenylamino-anthraquinone-2.6.4'-trisulfonic acid.

(89) 1-amino-4-(3'-amino-6'-methyl)-phenylamino-anthraquinone-2.7.4'-trisulfonic acid.

(90) 1-amino-4-[4'-(4''-amino-2''-methyl)-phenyl-3'-methyl]-phenylamino-anthraquinone-2.8.5''-trisulfonic acid.

(91) 1-amino-4-(4'-methylamino)-phenylamino-anthraquinone-2.6.2'-trisulfonic acid.

(92) 1-amino-4-(3'-methylamino-4'-methyl)-phenyl-amino-anthraquinone-2.5.6'-trisulfonic acid.

(93) Copperphthalocyanine-trisulfonic acid-sulfonic acid-(3'-amino)-phenylamide.

(94) Copperphthalocyanine-trisulfonic acid amide-sulfonic acid-(3'-amino)-phenylamide.

(95) Copperphthalocyanine-trisulfonic acid-sulfonic acid-(4'-amino-3'-sulfo)-phenylamide.

(96) Copperphthalocyanine-disulfonic acid-disulfonic acid-(4'-amino-3'-sulfo)-phenylamide.

(97) Copperphthalocyanine-trisulfonic acid-sulfonic acid-(2'-amino)-ethylamide.

(98) Mixed 1:2-chromium complex compound of 1-(2'-hydroxy-5'-chloro)-phenylazo-2-hydroxy-8-acetylamino-naphthalene-3'-sulfonic acid and 1-hydroxy-2-(2'-hydroxy-5'-chloro)-phenylazo-6-amino-naphthalene-3.3'-disulfonic acid.

(99) 1:2-chromium complex compound of 1-hydroxy-2-(2'-hydroxy-5'-chloro)-phenylazo-6-amino-naphthalene-3.3'-disulfonic acid.

(100) 1:2-cobalt complex compound of 1-hydroxy-2-(2'-hydroxy-5'-chloro)-phenylazo-6-amino-naphthalene-3.3'-disulfonic acid.

(101) 1:2-chromium complex compound of 1-(2'-hydroxy-3'-chloro)-phenylazo-2-hydroxy-8-amino-naphthalene-5'-sulfonic acid.

(102) 1:2-cobalt complex compound of 1-hydroxy-2-(2'-hydroxy-3'-chloro)-phenylazo-6-amino-naphthalene-3.5'-disulfonic acid.

(103) 1:2-chromium complex compound of 1-(2'-hydroxy-5'-nitro)-phenylazo-2-hydroxy-8-amino-naphthalene-3'-sulfonic acid.

(104) 1:2-chromium complex compound of 1-(2'-hydroxy-3'-nitro)-phenylazo-2-hydroxy-8-amino-naphthalene-5'-sulfonic acid.

(105) 1:2-chromium complex compound of 1-hydroxy-2-(2'-hydroxy-5'-nitro)-phenylazo-6-amino-naphthalene-3.3'-disulfonic acid.

(106) 1:2-cobalt complex compound of 1-hydroxy-2-(2'-hydroxy-5'-nitro)-phenylazo-6-amino-naphthalene-3.3'-disulfonic acid.

(107) 1:2-chromium complex compound of 1-hydroxy-2-(2'-hydroxy-3'-nitro)-phenylazo-6-amino-naphthalene-3.5'-disulfonic acid.

(108) 1:2-cobalt complex compound of 1-hydroxy-2-(2'-hydroxy-3'-nitro)-phenylazo-6-amino-naphthalene-3.5'-disulfonic acid.

(109) 1:2-chromium complex compound of 1-(2'-hydroxy)-phenylazo-2-hydroxy-8-amino-naphthalene-3.5'-disulfonic acid.

(110) 1:2-chromium complex compound of 1-hydroxy-2-(2'-hydroxy-6'-nitro)-naphthyl-(1')-azo-6-amino-naphthalene-3.4'-disulfonic acid.

(111) 1:2-cobalt complex compound of 1-hydroxy-2-(2'-hydroxy-6'-nitro)-naphthyl-(1')-azo-6-amino-naphthalene-3.4'-disulfonic acid.

(112) Mixed 1:2-Chromium complex compound of 1-(2'-hydroxy-3'-nitro)-phenylazo-2-hydroxy-8-amino-naphthalene-5'-sulfonic acid and 1-hydroxy-2-(2'-hydroxy-3'-chloro)-phenylazo-6-amino-naphthalene-3.5'-disulfonic acid.

(113) 1:2-chromium complex compound of 1-hydroxy-2-(2'-hydroxy)-naphthyl-(1')-azo-6-amino-naphthalene-3.4'-disulfonic acid.

(114) 1:2-chromium complex compound of 1-hydroxy-2-(2'-hydroxy)-phenylazo-6-amino-naphthalene-3-sulfonic acid-5'-sulfonic acid amide.

(115) 1-hydroxy-2-(3'-amino)-phenylazo-naphthalene-4.6.6'-trisulfonic acid.

(116) 1-hydroxy-2-(3'-amino)-phenylazo-naphthalene-4.7.6'-trisulfonic acid.

(117) 1-hydroxy-2-(3'-amino)-phenylazo-naphthalene-3.5.7.6'-tetrasulfonic acid.

(118) 1-hydroxy-2-(3'-amino)-phenylazo-naphthalene-3.6.6'-trisulfonic acid-8-sulfonic acid amide.

(119) Copper complex compound of 1-hydroxy-2-(2'-hydroxy)-phenylazo-8-amino-naphthalene-3.6.5'-trisulfonic acid.

(120) Nickel complex compound of 1-hydroxy-2-(2'-hydroxy)-phenylazo-8-amino-naphthalene-3.6.5'-trisulfonic acid.

(121) Copper complex compound of 1-hydroxy-2-(2'-hydroxy-5'-chloro)-phenylazo-8-amino-naphthalene-3.6.3'-trisulfonic acid.

(122) Copper complex compound of 1-hydroxy-2-(2'-hydroxy-3'-chloro)-phenylazo-8-amino-naphthalene-3.6.5'-trisulfonic acid.

(123) Copper complex compound of 1-hydroxy-2-(2'-hydroxy-5'-methylsulfonyl)-phenylazo-8-amino-naphthalene-3.6-disulfonic acid.

(124) Copper complex compound of 1-hydroxy-2-(2'-hydroxy)-phenylazo-8-amino-naphthalene-3.6-disulfonic acid-5'-sulfonic acid amide.
(125) Copper complex compound of 1-hydroxy-2-(2'-hydroxy)-phenylazo-8-amino-naphthalene-3.5.5'-trisulfonic acid.
(126) Copper complex compound of 1-hydroxy-2-(2'-hydroxy-5'-methylsulfonyl)-phenylazo-8-amino-naphthalene-3.5-disulfonic acid.
(127) Copper complex compound of 1-hydroxy-2-(2'-hydroxy)-phenylazo-8-amino-naphthalene-3.6.3'.5'-tetrasulfonic acid.
(128) Copper complex compound of 1-hydroxy-(2'-hydroxy-3'-carboxy)-phenylazo-8-amino-naphthalene-3.6.5'-trisulfonic acid.
(129) Copper complex compound of 1-hydroxy-2-(2'-hydroxy)-phenylazo-8-amino-naphthalene-3.5.3'.5'-tetrasulfonic acid.
(130) Copper complex compound of 1-hydroxy-2-(2'-hydroxy-3'-carboxy)-phenylazo-8-amino-naphthalene-3.5.5'-trisulfonic acid.
(131) 1-amino-4-(3'-amino)-phenylamino-anthraquinone-2.6.4'-trisulfonic acid.
(132) 1-amino-4-(3'-amino)-phenylamino-anthraquinone-2.4'-disulfonic acid.

The dyeings on cotton obtained with the dyestuffs Nos. 9 to 132 have the following shades.

| Dyestuff No. | Shade |
|---|---|
| 9 | Greenish yellow. |
| 10 | Do. |
| 11 | Red. |
| 12 | Yellowish red. |
| 13 | Blue. |
| 14 | Reddish yellow. |
| 15 | Bluish red. |
| 16 | Reddish orange. |
| 17 | Blue. |
| 18 | Turquoise blue. |
| 19 | Bluish red. |
| 20 | Do. |
| 21 | Do. |
| 22 | Bluish red. |
| 23 | Do. |
| 24 | Ruby. |
| 25 | Red. |
| 26 | Violet. |
| 27 | Yellow. |
| 28 | Reddish yellow. |
| 29 | Do. |
| 30 | Do. |
| 31 | Reddish yellow. |
| 32 | Greenish yellow. |
| 33 | Yellow. |
| 34 | Yellowish orange. |
| 35 | Greenish yellow. |
| 36 | Reddish yellow. |
| 37 | Golden. |
| 38 | Greenish yellow. |
| 39 | Do. |
| 40 | Yellow. |
| 41 | Reddish yellow. |
| 42 | Orange. |
| 43 | Do. |
| 44 | Do. |
| 45 | Do. |
| 46 | Orange red. |
| 47 | Orange. |
| 48 | Orange red. |
| 49 | Yellowish red. |
| 50 | Red. |
| 51 | Scarlet. |
| 52 | Bluish red. |
| 53 | Do. |
| 54 | Orange. |
| 55 | Yellowish red. |
| 56 | Do. |
| 57 | Scarlet. |
| 58 | Red. |
| 59 | Do. |
| 60 | Do. |
| 61 | Red. |
| 62 | Bordeaux. |
| 63 | Do. |
| 64 | Red. |
| 65 | Bluish red. |
| 66 | Do. |
| 67 | Scarlet. |
| 68 | Red. |
| 69 | Do. |
| 70 | Do. |
| 71 | Do. |
| 72 | Red-brown. |
| 73 | Brownish orange. |
| 74 | Greenish yellow. |
| 75 | Dark green. |
| 76 | Reddish yellow. |
| 77 | Red. |
| 78 | Violet-red. |
| 79 | Violet-blue. |
| 80 | Violet. |
| 81 | Blue-red. |
| 82 | Red-brown. |
| 83 | Reddish navy-blue. |
| 84 | Gray. |
| 85 | Olive-green. |
| 86 | Reddish navy-blue. |
| 87 | Reddish blue. |
| 88 | Do. |
| 89 | Reddish blue. |
| 90 | Blue. |
| 91 | Do. |
| 92 | Reddish blue. |
| 93 | Turquoise blue. |
| 94 | Do. |
| 95 | Do. |
| 96 | Do. |
| 97 | Do. |
| 98 | Reddish navy-blue. |
| 99 | Navy-blue. |
| 100 | Brownish violet. |
| 101 | Gray. |
| 102 | Brownish violet. |
| 103 | Greenish gray. |
| 104 | Gray. |
| 105 | Reddish navy-blue. |
| 106 | Brown. |
| 107 | Reddish navy-blue. |
| 108 | Brownish violet. |
| 109 | Gray. |
| 110 | Navy-blue. |
| 111 | Brownish violet. |
| 112 | Reddish navy-blue. |
| 113 | Navy-blue. |
| 114 | Reddish navy-blue. |
| 115 | Yellowish red. |
| 116 | Do. |
| 117 | Red-orange. |
| 118 | Red. |
| 119 | Violet. |
| 120 | Reddish violet. |
| 121 | Bluish violet. |
| 122 | Violet. |
| 123 | Reddish violet. |
| 124 | Violet. |
| 125 | Reddish violet. |
| 126 | Do. |

| Dyestuff No.: | Shade |
|---|---|
| 127 | Violet. |
| 128 | Do. |
| 129 | Reddish violet. |
| 130 | Do. |
| 131 | Blue. |
| 132 | Reddish blue. |

Formulae of representative dyestuffs of the foregoing examples are as follows:

*Example 1*

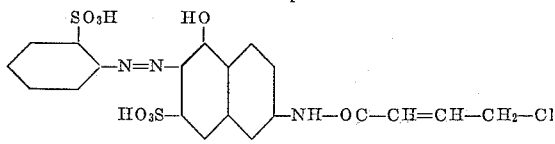

*Example 2*

(Paragraphs 1 to 3)

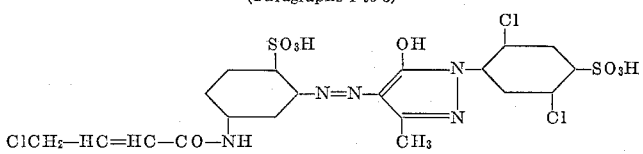

(last paragraph)

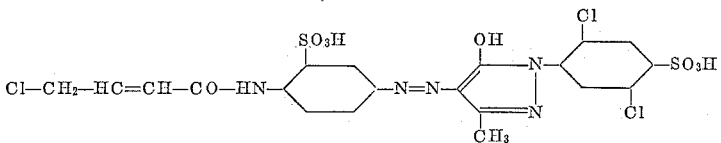

*Example 3*

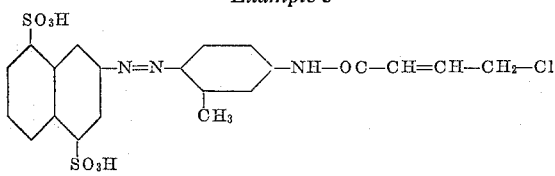

*Example 4*

(paragraph 1)

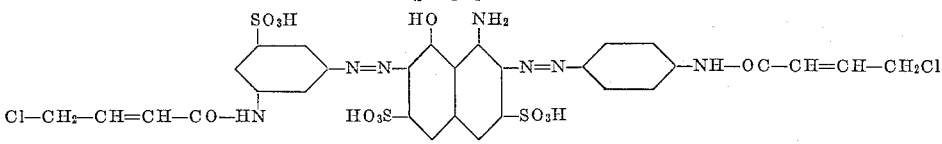

*Example 5*

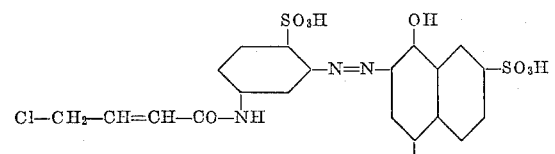

*Example 6*

(Paragraphs 1 and 2)

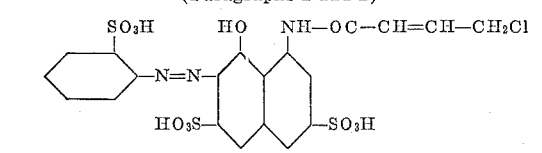

(Paragraph 6)

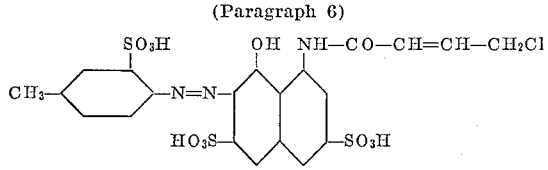

(Paragraph 6)

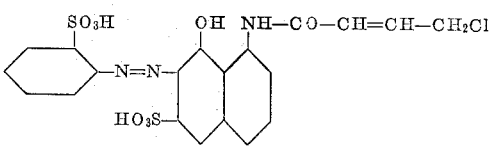

*Example 7*

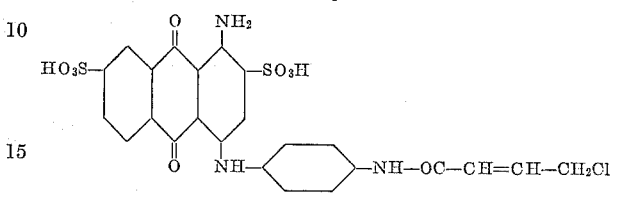

*Example 8*

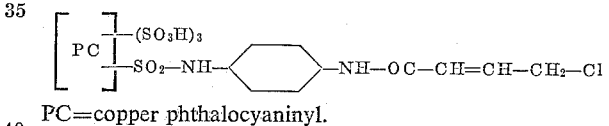

PC = copper phthalocyaninyl.

Having thus disclosed the invention what we claim is:

1. Water-soluble organic dyestuff consisting essentially of dyestuff grouping which bears from one to two γ-halocrotonylamino groups, "halo" being a halogen atom with an atomic number from 17 to 35, inclusive, said dyestuff grouping being selected from the group consisting of
   (1) benzene-azo-naphthalene groupings,
   (2) diphenyl-azo-naphthalene groupings,
   (3) naphthalene-azo-naphthalene groupings,
   (4) benzene-azo-3-methyl-5-pyrazolone groupings,
   (5) naphthalene-azo-3-methyl-5-pyrazolone groupings,
   (6) benzene - azo-naphthalene-azo-benzene groupings,
   (7) naphthalene - azo - naphthalene - azo - naphthalene groupings,
   (8) the 1:2-chromium, 1:2-cobalt, 1:1-copper and 1:1-nickel complexes of the groupings (1), (3), (4) and (5),
   (9) 1-amino-2-sulfo-4-arylamino-anthraquinone groupings wherein the aryl is hydrocarbon and is from mononuclear to binuclear, and the whole grouping bears from two to three sulfonic acid groups,
   (10) copper phthalocyanine-groupings bearing from 3 to 4 water-solubilizing groups selected from the group consisting of —SO₃H and —SO₂—NH₂
the groupings (1) to (8) inclusive bearing 2 to 4 sulfonic acid groups, and any substituents on said groupings (1) to (8) being selected from the group consisting of Cl, hydroxy, amino, methyl, methoxy, trifluoromethyl, nitro, acetylamino, propionylamino, sulfoacetylamino, benzoylamino, chlorobenzoylamino, carboxy, phenyl, chlorophenyl, methylchlorophenyl, dichlorophenyl, dimethylphenyl, naphthyl, methylbenzothiazolyl, methylsulfonyl and —SO$_2$—NH$_2$.

2. The water-soluble organic dyestuff of the formula

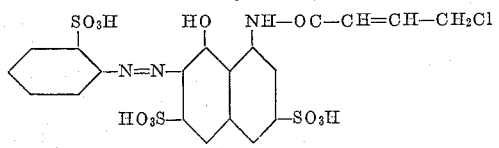

3. The water-soluble organic dyestuff of the formula

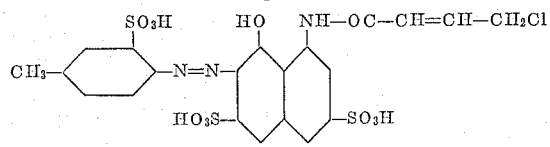

4. The water-soluble organic dyestuff of the formula

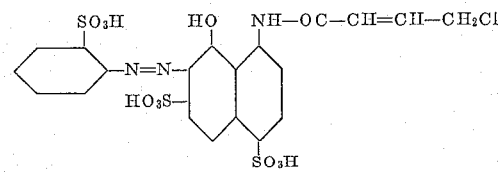

5. The water-soluble organic dyestuff of the formula

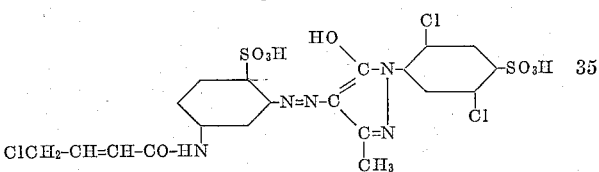

6. The water-soluble organic dyestuff of the formula

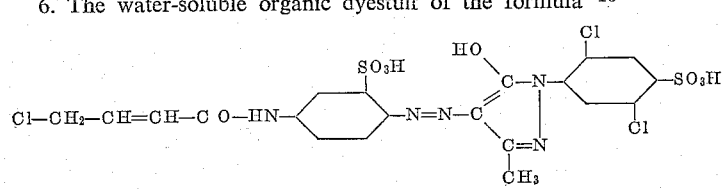

7. The water-soluble organic dyestuff of the formula

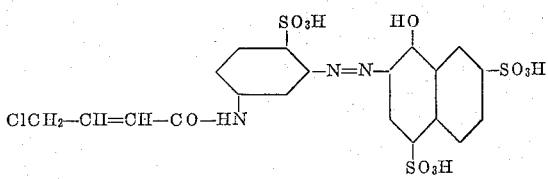

8. The water-soluble organic dyestuff of the formula

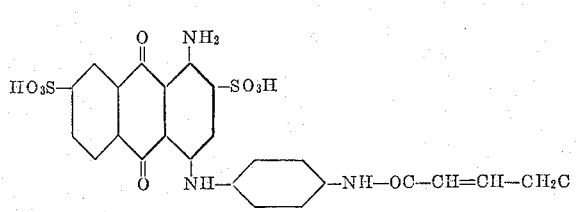

9. The water-soluble organic dyestuff of the formula

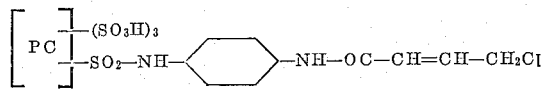

PC=copper phthalocyaninyl.

References Cited in the file of this patent
UNITED STATES PATENTS
2,720,517    Kartaschoff et al. _____ Oct. 11, 1955

FOREIGN PATENTS
1,212,810    France _____ Oct. 26, 1959

UNITED STATES PATENT OFFICE
CERTIFICATE OF CORRECTION

Patent No. 3,114,746 December 17, 1963

Jakob Benz et al.

It is hereby certified that error appears in the above numbered patent requiring correction and that the said Letters Patent should read as corrected below.

Column 3, line 7, for "γ-gromocrotonic" read -- γ-bromocrotonic --; column 5, line 73, for "steam" read -- steamed --; column 6, line 53, for "to", first occurrence, read -- of --; line 71, for "acrylation" read -- acylation --; column 16, lines 14 to 21, for that portion of the formula reading $-CH_2C$ read $-CH_2Cl$ Signed and sealed this 14th day of July 1964.

(SEAL)

Attest:

ESTON G. JOHNSON
Attesting Officer

EDWARD J. BRENNER
Commissioner of Patents